US012755885B2

(12) United States Patent
Wang et al.

(10) Patent No.: US 12,755,885 B2
(45) Date of Patent: Oct. 6, 2026

(54) INDUCTOR COIL AND FORMING METHOD THEREOF

(71) Applicant: Semiconductor Manufacturing International (Shanghai) Corporation, Shanghai (CN)

(72) Inventors: Xiaodong Wang, Shanghai (CN); Weihong Qian, Shanghai (CN); Xining Wang, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 726 days.

(21) Appl. No.: 18/137,801

(22) Filed: Apr. 21, 2023

(65) Prior Publication Data

US 2023/0343501 A1 Oct. 26, 2023

(30) Foreign Application Priority Data

Apr. 24, 2022 (CN) ......................... 202210453208.3

(51) Int. Cl.
*H01F 17/00* (2006.01)
*H01F 41/04* (2006.01)

(52) U.S. Cl.
CPC ... *H01F 17/0013* (2013.01); *H01F 2017/002* (2013.01); *H01F 41/041* (2013.01)

(58) Field of Classification Search
CPC ............... H01F 17/0013; H01F 41/041; H01F 2017/002; H01F 2017/0073; H01F 27/28; H10D 1/20; H10W 20/031; H10W 20/497
USPC ......................... 336/170, 199, 200, 205, 232
See application file for complete search history.

(56) References Cited

U.S. PATENT DOCUMENTS 7,312,683 B1 * 12/2007 Lee ..................... H01F 17/0013 336/200
2009/0322447 A1 * 12/2009 Daley .................... H10D 88/00 257/E29.001
2010/0308470 A1 12/2010 Chen
2013/0043968 A1 * 2/2013 Cho .................... H10W 20/497 336/200
2013/0249660 A1 * 9/2013 Ler ....................... H01F 41/041 336/200
2020/0027637 A1 * 1/2020 Sano ................... H01F 17/0013

* cited by examiner

*Primary Examiner* — Kenneth Whittington
(74) *Attorney, Agent, or Firm* — Anova Law Group, PLLC

(57) ABSTRACT

An inductor coil includes: a substrate, including a base, a device layer on the base, a conductive layer, and an electrical interconnect structure; a plurality of stacked coil layers being on the substrate, each of the plurality of stacked coil layers including a plurality of sub-coil structures on a same layer; and a plurality of electrical connection layers between two adjacent coil layers, a projection pattern of each electrical connection layer on a surface of the substrate being within a range of projection patterns of two adjacent coil layers that are in contact with the plurality of electrical connection layers on the surface of the substrate, and all the plurality of coil layers being connected in parallel through all the plurality of electrical connection layers.

20 Claims, 9 Drawing Sheets

INDUCTOR COIL AND FORMING METHOD THEREOF

CROSS-REFERENCE TO RELATED APPLICATION

This application claims priority of Chinese Patent Application No. 202210453208.3, filed on Apr. 24, 2022, the entire content of which is hereby incorporated by reference.

FIELD OF THE DISCLOSURE

The present disclosure generally relates to the field of semiconductor technology and, more particularly, relates to an inductor coil and a forming method thereof.

BACKGROUND

An inductor is a component that can convert electrical energy into magnetic energy and store magnetic energy. Inductors are widely applied in radio frequency circuit devices, including low noise amplifiers, voltage-controlled oscillators, and the like.

A quality factor Q is an important physical quantity that characterizes a working efficiency of an inductor. The quality factor Q refers to a ratio of an inductive reactance presented by the inductor to an equivalent resistance loss thereof when the inductor operates at a certain frequency of AC voltage. The higher the quality factor Q of the inductor, the smaller an equivalent resistance loss thereof and the higher an efficiency thereof.

An inductor coil is a basic component of an inductor. The inductor coil works on a principle of electromagnetic induction. A quality factor Q of the inductor is related to a DC resistance of the inductor coil. Reducing an electrical resistance value of the inductor coil is conducive to improving the quality factor Q of the inductor.

To make the quality factor Q of an inductor higher, a parallel connection of double-layer metal inductor coil is widely applied to reduce an electrical resistance of the inductor coil. However, in the existing technologies, a size of a conductive plug connecting the double-layer metal coil in parallel is small, so that the electrical resistance of the inductor coil is large, thereby making the quality factor Q of the inductor low.

BRIEF SUMMARY OF THE DISCLOSURE

One aspect of the present disclosure provides an inductor coil. The inductor coil includes: a substrate, including a base, a device layer on the base, a conductive layer, and an electrical interconnect structure; a plurality of stacked coil layers being on the substrate, each coil layer including a plurality of sub-coil structures on a same layer; and a plurality of electrical connection layers between two adjacent coil layers, a projection pattern of each of the plurality of electrical connection layers on a surface of the substrate being within a range of projection patterns of two adjacent coil layers that are in contact with the plurality of electrical connection layers on the surface of the substrate, all the plurality of coil layers being connected in parallel through all the plurality of electrical connection layers, and any section that is perpendicular to the substrate and simultaneously passes through all the plurality of sub-coil structures in two adjacent coil layers passes through an electrical connection layer.

Another aspect of the present disclosure provides a method of forming an inductor coil. The forming method includes: providing a substrate comprising a base, a device layer on the base, a conductive layer, and an electrical interconnect structure; and forming a plurality of stacked coil layers on the substrate, and a plurality of electrical connection layers between two adjacent coil layers, a projection pattern of each of the plurality of electrical connection layers on a surface of the substrate being in a range of projection patterns of two adjacent coil layers in contact with the electrical connection layers on the surface of the substrate; and each coil layer including a plurality of sub-coil structures in a same layer, all the plurality of coil layers being connected in parallel through all the plurality of electrical connection layers, and any section that is perpendicular to the substrate and simultaneously passing through all the plurality of sub-coil structures in two adjacent coil layers passing through an electrical connection layer.

Other aspects of the present disclosure can be understood by a person skilled in the art in light of the description, the claims, and the drawings of the present disclosure.

DETAILED DESCRIPTION

As described above, a size of a conductive plug connecting the double-layer metal coil in parallel is small, so that an electrical resistance of the inductor coil is large, thereby making the quality factor Q of the inductor low.

Figure 1:
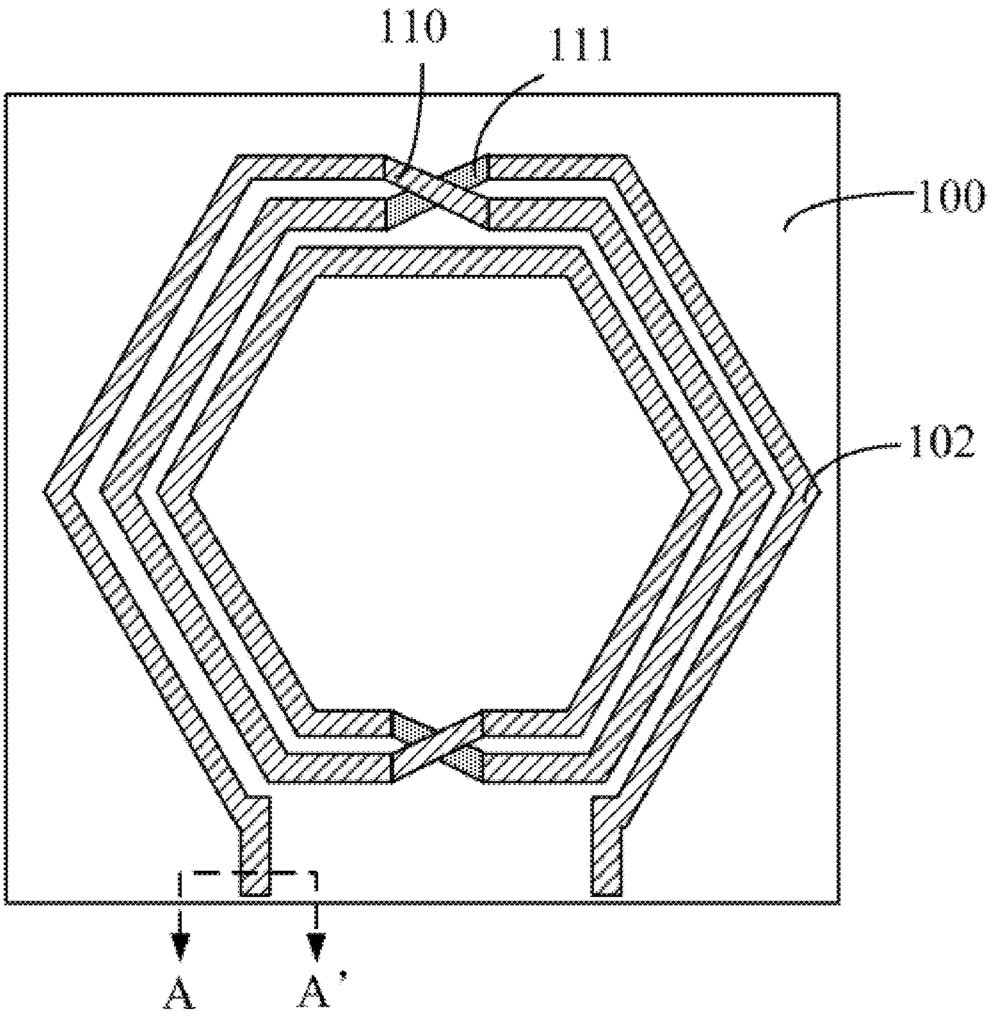
FIG. 1 and FIG. 2 illustrate schematic diagrams of an inductor coil.
Figure 2:
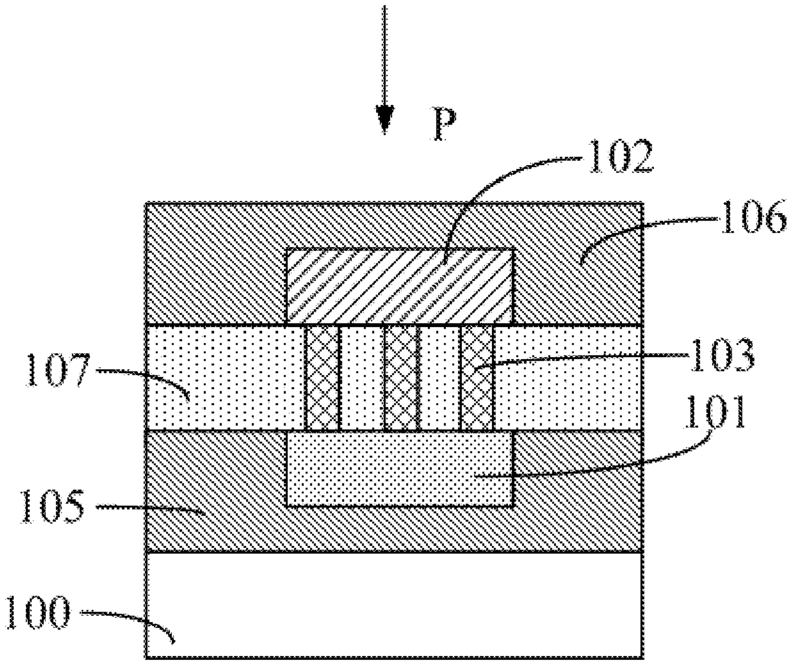

FIG. 1 and FIG. 2 illustrate schematic diagrams of an inductor coil. FIG. 1 illustrates a top view of FIG. 2 along a direction P. FIG. 2 illustrates a cross-sectional view of FIG. 1 along a direction AA'.

The inductor coil includes: a substrate 100; a first dielectric layer 105 on the substrate 100, and a first coil layer 101 in the first dielectric layer 105; a second dielectric layer 106 on the first dielectric layer 105, and a second coil layer 102 in the second dielectric layer 106; an interconnection medium layer 107 between the first medium layer 105 and the second medium layer 106; a plurality conductive plugs 103 in the interconnection medium layers 107, the first coil layer 101 being connected to the second coil layer 102 in parallel by the plurality conductive plugs 103.

The first coil layer 101 includes a plurality of first substructures (not marked). The second coil layer 102 includes a plurality of second substructures (not marked). The first substructures in a same layer are electrically connected to each other through the plurality of first connection parts 110. The second substructures in a same layer are electrically connected to each other through the plurality of second connection parts 111.

Since widths of the conductive plugs 103 between the first coil layer 101 and the second coil layer 102 are small and a distribution area for the conductive plugs 103 is limited.

Contact areas between the conductive plugs 103 and the first coil layer 101 and the second coil layer 102 are small, so that an electrical resistance of the inductor coil is relatively large, and a quality factor Q of the inductor coil is relatively low.

It should be noted that, for ease of understanding, the first dielectric layer 105, the second dielectric layer 106 and the interconnection dielectric layer 107 are omitted in FIG. 1.

To solve the above technical problems, a technical solution of the present disclosure provides a method of forming an inductor coil. By forming a plurality of stacked coil layers and a plurality of electrical connection layers between two adjacent coil layers and each coil layer including a plurality of sub-coil structures in a same layer, each coil layer is connected to each other in parallel through each electrical connection layer, any cross section perpendicular to the substrate and simultaneously passing through all the sub-coil structures in two adjacent coil layers passes through an electrical connection layer, thereby expanding a distribution range of the electrical connection layers, increasing contact areas between the electrical connection layers and the coil layers, reducing the electrical resistance of the inductor coil, improving a quality factor Q of the inductor coil, and optimizing a working efficiency of the inductor coil.

To make the above objects, features and beneficial effects of the present disclosure more comprehensible, specific embodiments of the present disclosure are described in detail below in conjunction with accompanying drawings.

Figure 3:
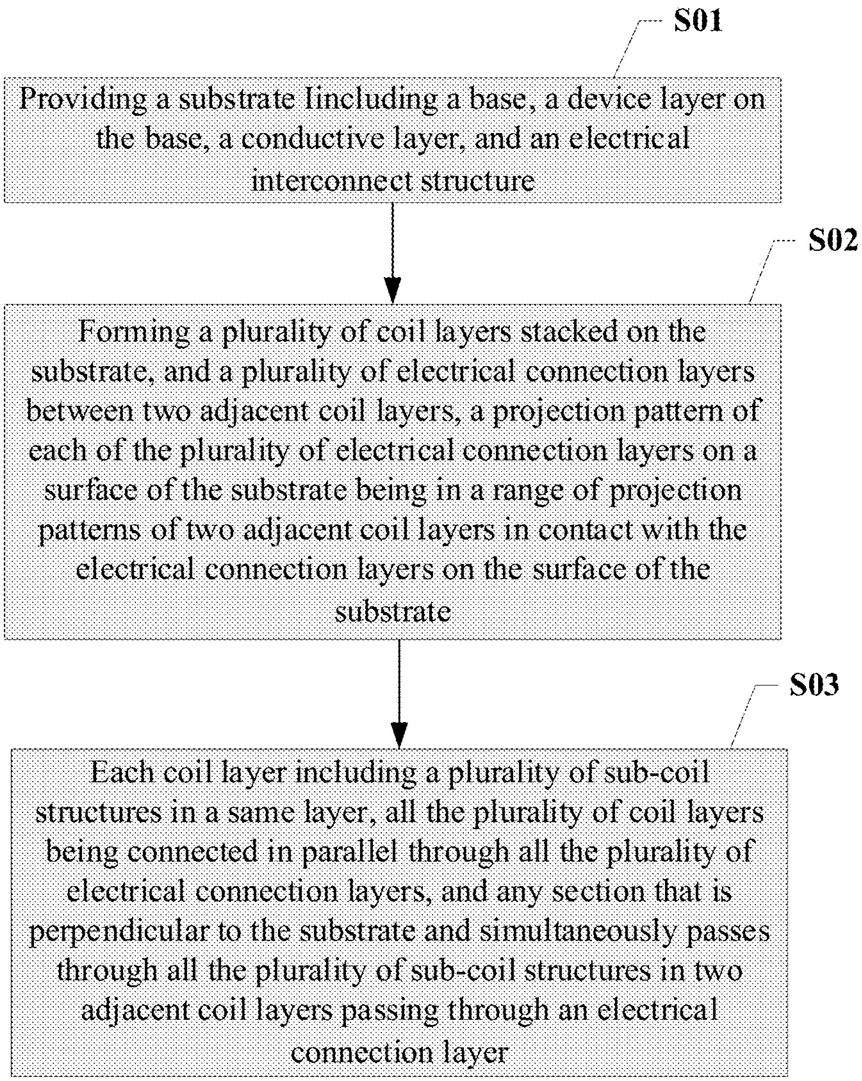
FIG. 3 illustrates a flow chart of a method of forming an inductor coil according to an embodiment of the present disclosure.

FIG. 3 illustrates a flow chart of a method of forming an inductor coil according to an embodiment of the present disclosure. FIGS. 4-9 illustrate schematic diagrams of a forming process of the inductor coil according to an embodiment of the present disclosure.

Figure 4:
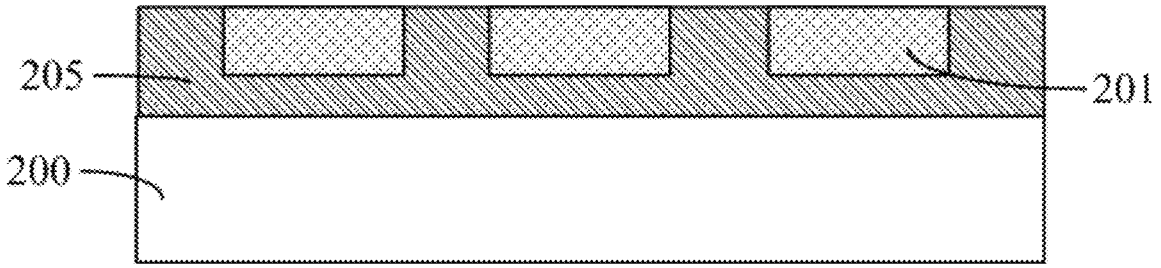
FIGS. 4-9 illustrate schematic diagrams of an inductor coil at various stages during its formation process according to an embodiment of the present disclosure.

Referring to FIG. 4, the forming process of the inductor coil includes: providing a substrate 200 including a base (not shown), a device layer (not shown) on the base, a conductive layer (not shown) and an electrical interconnection structure (not shown); forming a first dielectric layer 205 on the substrate 200 and a first coil layer 201 in the first dielectric layer 205.

A material of the substrate 200 includes silicon, silicon germanium, silicon carbide, silicon on insulator (SOI), germanium on insulator (GOI) and the like. Specifically, in one embodiment, the material of the substrate 200 is silicon.

In one embodiment, a method of forming the first dielectric layer 205 and the first coil layer 201 includes: forming the first dielectric layer 205 on the substrate 200; forming first grooves (not shown) on the first dielectric layer 205; forming the first coil layer 201 in the first grooves.

In one embodiment, a material of the first coil layer 201 includes copper.

Figure 5:
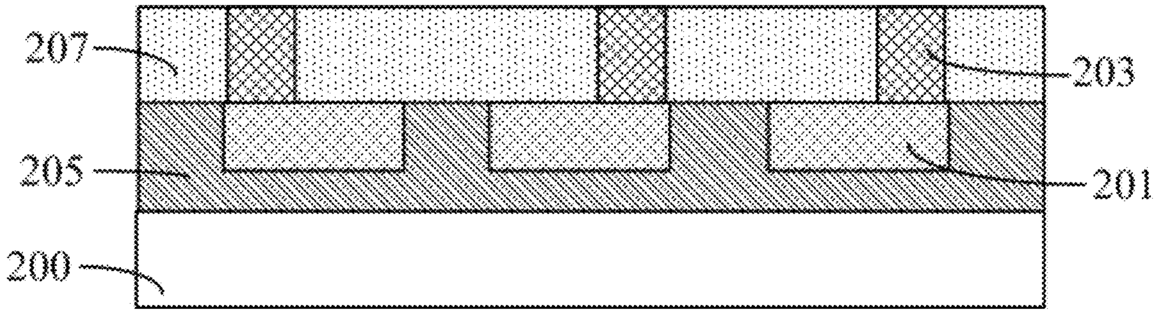

Referring to FIG. 5, the forming process of the inductor coil further includes: forming an interconnection dielectric layer 207 on the first dielectric layer 205 and the first coil layer 201, and the electrical connection layers 203 in the interconnection dielectric layer 207.

In one embodiment, a method of forming the interconnection dielectric layer 207 and the electrical connection layers 203 includes: forming an interconnection dielectric layer 207 on the first dielectric layer 205 and the first coil layer 201; forming interconnection grooves (not shown) on the interconnection dielectric layer 207; and forming the electrical connection layers 203 in the interconnection grooves.

In one embodiment, a material of the electrical connection layers 203 includes aluminum.

Figure 6:
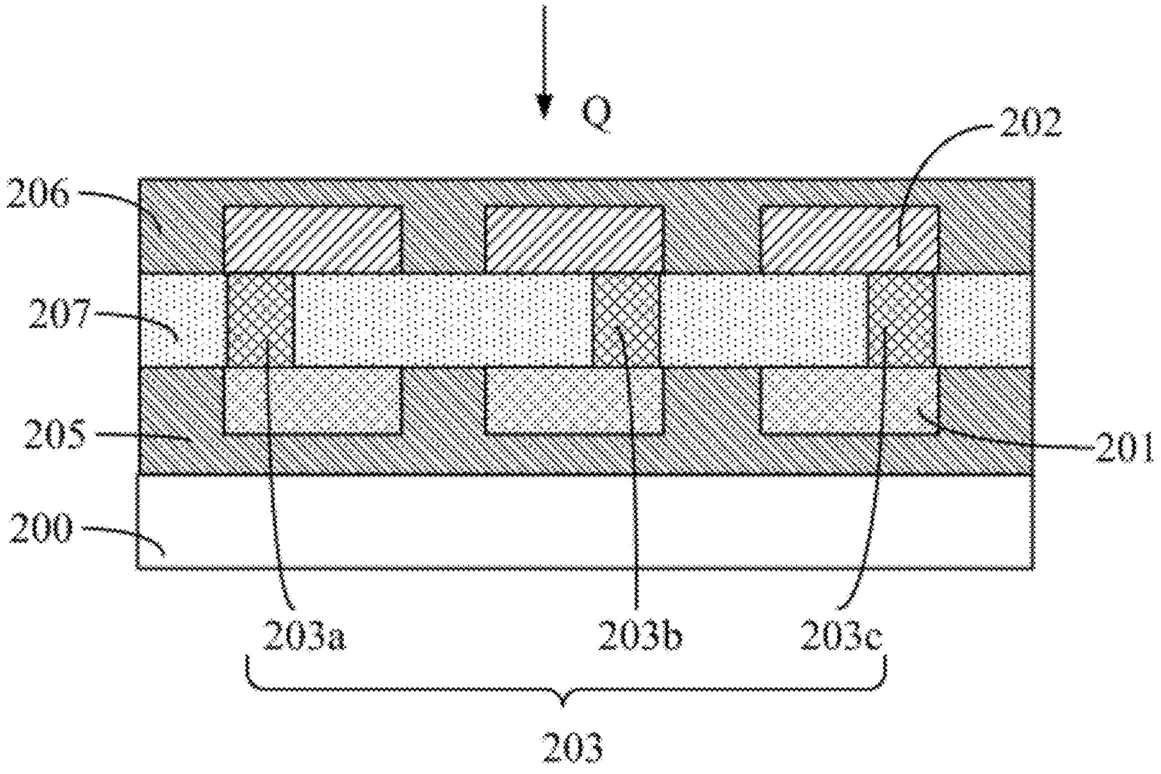

Referring to FIG. 6, the forming process of the inductor coil further includes: forming a second dielectric layer 206 on the interconnection dielectric layer 207 and the electrical connection layers 203 and forming second coil layer 202 in the second dielectric layer 206.

In one embodiment, forming the second dielectric layer 206 and the second coil layer 202 includes: forming initial second coil layer (not shown) on the interconnection dielectric layer 207 and the electrical connection layers 203; etching the initial second coil layer to form the second coil layer 202; and forming the second dielectric layer 206 surrounding the second coil layer 202.

In one embodiment, a material of the second coil layer 202 includes aluminum.

In other embodiments, the material of the first coil layer is same as the material of the second coil layer.

Figure 7:
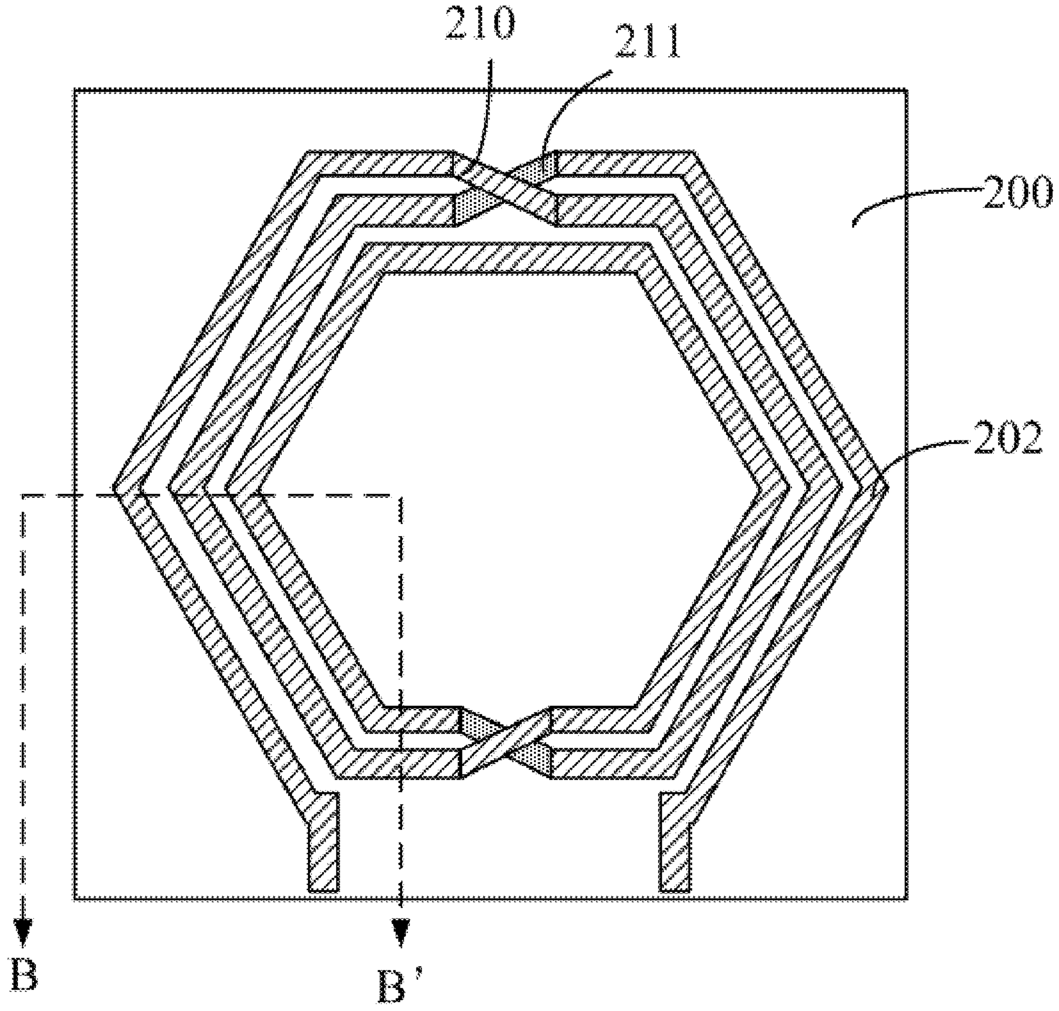
Figure 8:
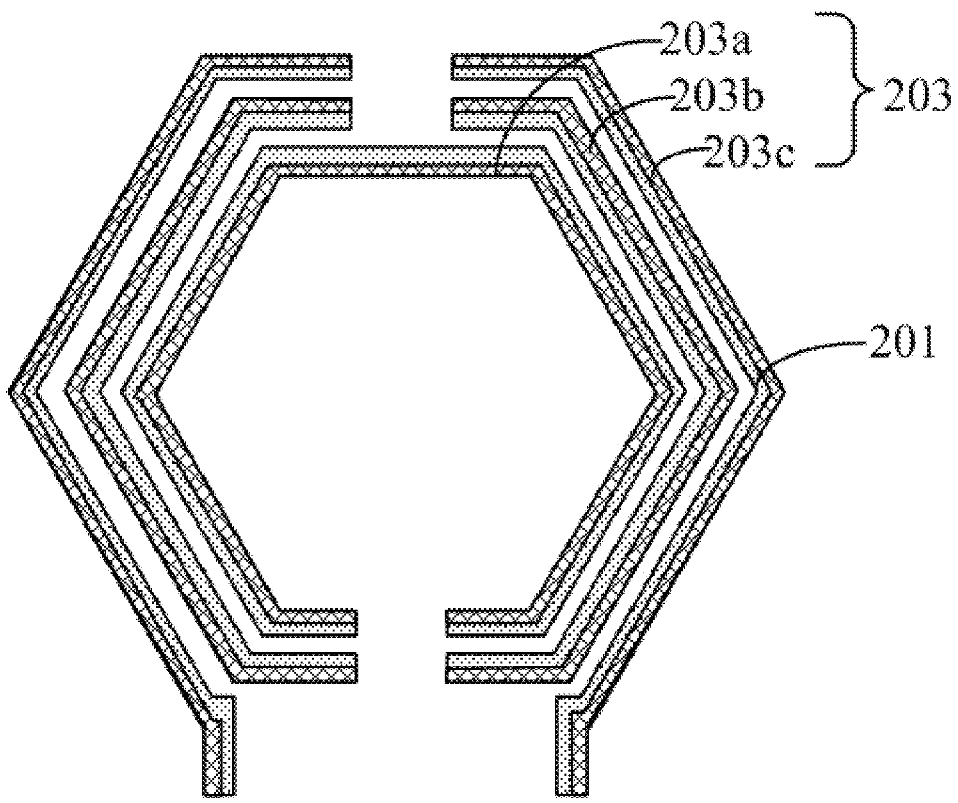
Figure 9:
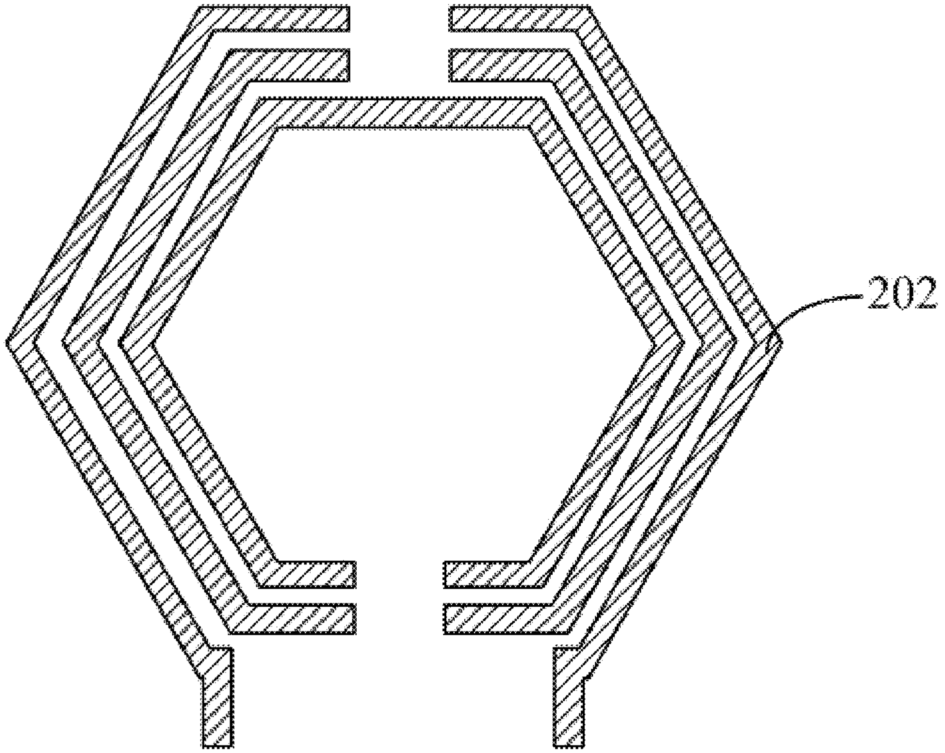

FIG. 6 illustrates a cross-sectional view of FIG. 7 along a BB' direction, FIG. 7 illustrates a top view of FIG. 6 along a Q direction, FIG. 8 illustrates a top view of the first coil layer 201 in FIG. 6 and the electrical connection layers 203 along the Q direction, and FIG. 9 illustrates a top view of the second coil layer 202 in FIG. 6 along the Q direction.

It should be noted that, for ease of understanding, the first dielectric layer 205, the second dielectric layer 206 and the interconnection dielectric layer 207 are omitted in FIG. 7.

As shown in FIGS. 6 to 9, the second coil layer 202 are stacked on the first coil layer 201. Both the first coil layer 201 and the second coil layer 202 include a plurality of sub-coil structures in a same layer. The electrical connection layers 203 are between the first coil layer 201 and the second coil layer 202. A projection pattern of the electrical connection layers 203 on a surface of the substrate 200 is within a range of projection patterns of the first coil layer 201 and the second coil layer 202 in contact with the electrical connection layers 203 on the surface of the substrate 200. The first coil layer 201 and the second coil layer 202 are connected in parallel through the electrical connection layers 203. Any cross section perpendicular to the substrate 200 and passing through all sub-coil structures in the first coil layer 201 and the second coil layer 202 passes through an electrical connection layer 203.

In other embodiments, after the second coil layer is formed, a plurality of stacked coil layers on the second coil layer and a plurality of electrical connection layers between two adjacent coil layers may also be formed. A projection pattern of each electrical connection layer on the surface of the substrate is in a range of a projection pattern of two adjacent coil layers in contact with the electrical connection layers on a surface of the substrate. All the coil layers are connected to each other in parallel through electrical connection layers. Any cross section perpendicular to the substrate and simultaneously passing through all sub-coil structures in two adjacent coil layers passes through an electrical connection layer.

Correspondingly, one embodiment of the present disclosure also provides an inductor coil.

Referring to FIGS. 5-8, the inductor coil includes: a substrate 200, the substrate 200 includes a base (not shown), a device layer (not shown) on the base, a conductive layer (not shown) and an electrical interconnection structure (not shown); stacked coil layers on the substrate 200 including the first coil layer 201 and the second coil layer 202, and each of the first coil layer 201 and the second coil layer 202 including a plurality of sub-coil in a same layer; electrical connection layers 203 between the first coil layer 201 and the second coil layer 202, a projection pattern of the electrical connection layers 203 on the surface of the substrate 200 being in a range of a projection pattern of the first coil layer s201 and the second coil layer 202 in contact with the electrical connection layers 203 on the surface of the substrate 200, the first coil layer 201 being connected to the second coil layer 202 in parallel through the electrical connection layers 203, and any cross-section perpendicular to the substrate 200 and simultaneously passing through all the sub-coil structures in the first coil layer 201 and the second coil layer 202 passing through an electrical connection layer 203.

In one embodiment, the inductor coil further includes: a first dielectric layer 205 on the substrate 200, and the first coil layer 201 being in the first dielectric layer 205; an interconnection dielectric layer 207 on the first coil layer 201 and the first dielectric layer 205, the electrical interconnection layers 203 being in the interconnection dielectric layer 207; and a second dielectric layer 206 on the electrical interconnect layers 203 and the interconnect dielectric layer 207, the second coil layer 202 being in the second dielectric layer 206.

In one embodiment, a first coil layer 201 includes a plurality of sub-coil structures in a same layer. A projection pattern of each sub-coil structure on the surface of the substrate 200 is a ring with an opening. A structure of a second coil layer 202 is same as a structure of the first coil layer 201.

In one embodiment, each coil layer includes more than one sub-coil structure, and the sub-coil structures are arranged in concentric rings.

In one embodiment, the sub-coil structures in a same layer are electrically connected to each other through connecting bridges. Specifically, the connecting bridges include a first connecting bridge 211 in a same layer as the first coil layer 201, and a second connecting bridge 210 in a same layer as the second coil layer 202. An extending direction of the first connecting bridge 211 is different from an extending direction of the second connecting bridge 210. Both two ends of the opening of the part of the sub-coil structure included in the first coil layer 201 are in contact with the first connecting bridge 211. Both two ends of openings of part of sub-coil structures included in the second coil layer 202 are in contact with the second connecting bridge 210. The first connecting bridge 211 and the second connecting bridge 210 make the sub-coil structures in a same layer to be connected to each other.

In one embodiment, a radius of each sub-coil structure ranges from 10 microns to 300 microns; a width of each sub-coil structure ranges from 0.5 microns to 100 microns. Distances among the sub-coil structures in a same layer range from 0.5 microns to 50 microns. Number of sub-coil structures included in each coil layer ranges from 1 to 20.

In one embodiment, an electrical connection layer 203 includes a plurality of sub-connection structures located on the same layer. A projection pattern of each sub-connection structure on the surface of the substrate 200 is a ring with an opening. A lower surface of each sub-connection structure is in contact with each sub-coil structure included in a first coil layer 201. An upper surface of each sub-connection structure is in contact with each sub-coil structure included in a second coil layer 202.

Compared with a scheme of parallel connection of the first coil layer 201 and the second coil layer 202 through a plurality of separate conductive plugs, In one embodiment, since a projection pattern of the sub-connection structures on the surface of the substrate 200 includes a plurality of rings with openings, for the sub-connection structures and the sub-coil structures in contact with the sub-connection structures, any cross-section perpendicular to the surface of the substrate 200 and passing through the sub-coil structures passes through a sub-connection structure so that contact surfaces between the sub-connection structures and the sub-coil structures can extend continuously in all areas of the sub-coil structures, thereby expanding a distribution range of the sub-connection structures. Furthermore, the contact surfaces between the sub-connection structures and the sub-coil structures are also continuous ring shapes, thereby increasing contact areas between the sub-connection structures and the sub-coil structures, reducing the electrical resistance of the inductor coil, improving the quality factor Q of the inductor coil, and optimizing the working efficiency of the inductor coil.

In one embodiment, a width of each sub-coil structure is same; a ratio of a width of a sub-connection structure to a width of a sub-coil structure is in the range of 1:3 to 2:3.

Number of the sub-connection structures included in an electrical connection layer 203 is greater than 1, and the sub-connection structures are arranged in concentric rings.

Specifically, number of the sub-connection structures is equal to number of sub-coil structures in a same layer. Therefore, any adjacent sub-coil structures on different layers are connected in parallel by the sub-connection structures, and contact surfaces between each sub-coil structures and sub-connection structures are rings with openings, thereby further increasing contact areas between the sub-coil structures and the sub-connection structures, reducing the electrical resistance of the inductor coil and increasing a maximum quality factor, Qmax, that the inductor coil can achieve.

In addition, since the sub-connection structures are continuous structures, a patterning process and an etching process used in a process of forming the electrical connection layers 203 are simpler, thereby expanding a process window and simplifying a process flow.

Specifically, in one embodiment, number of sub-coil structures included in a first coil layer 201 and number of sub-coil structures included in the second coil layer 202 are equal to three. Number of sub-connection structures included in an electrical connection layer 203 is equal to three.

Results of computer simulations show that when number of sub-coil structures included in each coil layer is equal to 3, a width of the sub-coil structures is equal to 8 microns. When a minimum radius of the sub-coil structures is equal to 60 microns, compared with the embodiment described in FIG. 1, the maximum quality factor Qmax of the inductor coil in one embodiment is increased by 12%.

In another embodiment, number of sub-coil structures included in each coil layer is equal to 1, and number of sub-connection structures included in an electrical connection layer is equal to 1.

In another embodiment, number of sub-coil structures included in each coil layer and number of sub-connection structures included in an electrical connection layer are other natural numbers greater than 1.

In other embodiments, each electrical connection layer includes number of discretely arranged conductive plugs. Projection patterns of the conductive plugs on the surface of the substrate are scattered and distributed in all areas of projections of the sub-coil structures on the surface of the substrate.

In one embodiment, since number of sub-connection structures included in an electrical connection layer 203 is greater than 1, and the sub-connection structures are arranged in concentric rings, parasitic capacitances exist among the sub-connection structures. When a frequency of the inductor coil is high, the parasitic capacitances among the sub-connection structures have a great influence on the quality factor Q of the inductor coil. A large parasitic capacitance may decrease the quality factor Q of the inductor coil at a high frequency, thereby reducing the working efficiency of the inductor coil.

To reduce the parasitic capacitances among sub-connection structures, in one embodiment, by adjusting relative positions of the sub-connection structures in contact with the sub-coil structures and distances among adjacent sub-connection structures, a sum of the distances among the sub-connection structures is increased as much as possible to achieve an effect of reducing the parasitic capacitances among the sub-connection structures.

In one embodiment, a distance between at least one set of adjacent sub-connection structures is greater than a first pitch of the sub-connection structures.

The first pitch is an average value of distances among sub-connection structures when a central axis of each sub-connection structure coincides with a central axis of at least one sub-coil structure.

Specifically, each coil layer has a second pitch. The second pitch is a sum of an average width of all the sub-coil structures and an average distance among the sub-coil structures in each coil layer. The first pitch is a minimum value of the second pitches of two coil layers connected by the sub-connection structures.

Therefore, compared to a solution in which a central axis of each sub-connection structure coincides with a central axis of at least one sub-coil structure, in one embodiment, by increasing a distance between at least one set of adjacent sub-connection structures and adjusting positions of other sub-connection structures accordingly to ensure that spacings between other sub-connection structures are not reduced, a sum of spacings between all sub-connection structures is increased, thereby reducing the overall parasitic capacitances among sub-connection structures, alleviating a decrease of the quality factor Q of the inductor coil at a high frequency, and improving the working efficiency of the inductor coil.

Referring to FIG. 6, specifically, in one embodiment, each sub-coil structure includes a first sidewall close to a center of concentric rings and a second sidewall away from the center of the concentric ring, and each sub-connection structure includes a third sidewall close to a center of concentric rings and a fourth sidewall away from the center of the concentric rings.

In one embodiment, an electrical connection layer 203 includes a smallest sub-connection structure 203*a* closest to a center of a concentric ring, a second sub-connection structure 203*b* adjacent to the smallest sub-connection structure 203*a*, and a third sub-connection structure 203*c* farthest from the center of the concentric ring.

The third sidewall of the smallest sub-connection structure 203*a* and the first sidewalls of the sub-coil structures in contact with the smallest sub-connection structure 203*a* are coplanar. The fourth sidewall of the second sub-connection structure 203*b* and the second sidewalls of the sub-coil structures in contact with the second sub-connection structure 203*b* are coplanar.

In one embodiment, since a width and a spacing of each sub-coil structure included in each coil layer are same, the first pitch is a sum of a width of a sub-coil structure and a spacing between the sub-coil structure and each of other sub-coil structures in each coil layer. Therefore, by making the smallest sub-connection structure 203*a* and the second sub-connection structure 203*b* far away from each other, a spacing between the smallest sub-connection structure 203*a* and the second sub-connection structure 203*b* is greater than the first pitch, and at a same time a position of the third sub-connection structure 203*c* is adjusted to ensure that a distance between the second sub-connection structure 203*b* and the third sub-connection structure 203*c* remains unchanged, thereby increasing overall distances among the smallest sub-connection structure 203*a*, the second sub-connection structure 203*b* and the third sub-connection structure 203*c* and reducing overall parasitic capacitances among the sub-connection structures.

In another embodiment, the sub-connection structure farthest from the center of the concentric rings is a largest sub-connection structure. The fourth sidewall of the largest sub-connection structure, and the second sidewalls of all the sub-coil structure in contact with the largest sub-connection structure are coplanar. A sub-connection structure adjacent to the largest sub-connection structure is denoted as a second sub-connection structure. The third sidewall of the second sub-connection structure and the first sidewalls of all the sub-coil structures in contact with the second sub-connection structure are coplanar.

Since a radius of the largest sub-connection structure is largest, by increasing a distance between the largest sub-connection structure and the second sub-connection structure, parasitic capacitances among all the sub-connection structures can be reduced to a greater extent.

In one embodiment, number of sub-connection structures is equal to number of sub-coil structures in a same layer, so that a contact area between a sub-connection structure and each sub-coil structure is greatly improved, thereby effectively reducing the electrical resistance of the inductor coil and improving the maximum quality factor Qmax that can be achieved by the inductor coil. In addition, by increasing distances among adjacent sub-connection structures, parasitic capacitances among all the sub-connection structures are further reduced, the decrease of the quality factor Q of the inductor coil at a high frequency is alleviated, and the overall working efficiency of the inductor coil is improved.

In one embodiment, a material of the first coil layer 201 is different from a material of the second coil layer 202. The material of the first coil layer 201 includes copper and the material of the second coil layer 202 includes aluminum.

In other embodiments, the material of the first coil layer is same as the material of the second coil layer.

Figure 10:
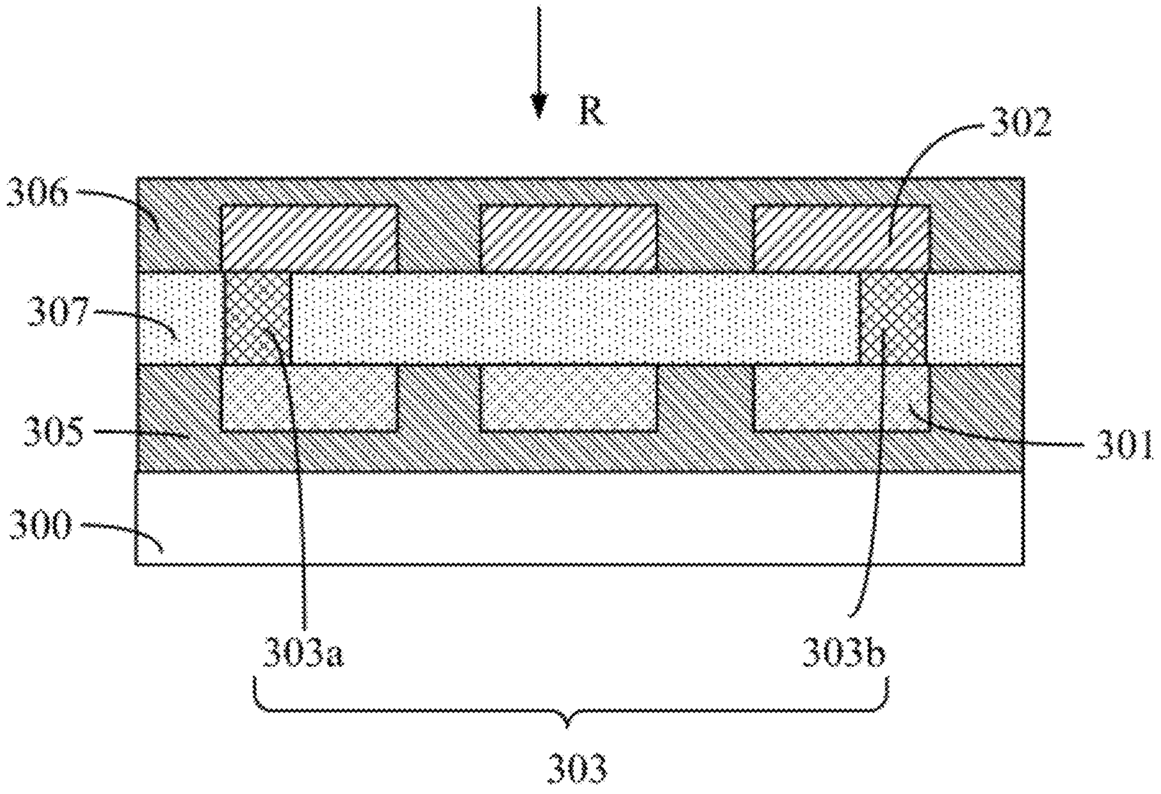
FIG. 10 and FIG. 11 illustrate schematic diagrams of an inductor coil according to another embodiment of the present disclosure.
Figure 11:
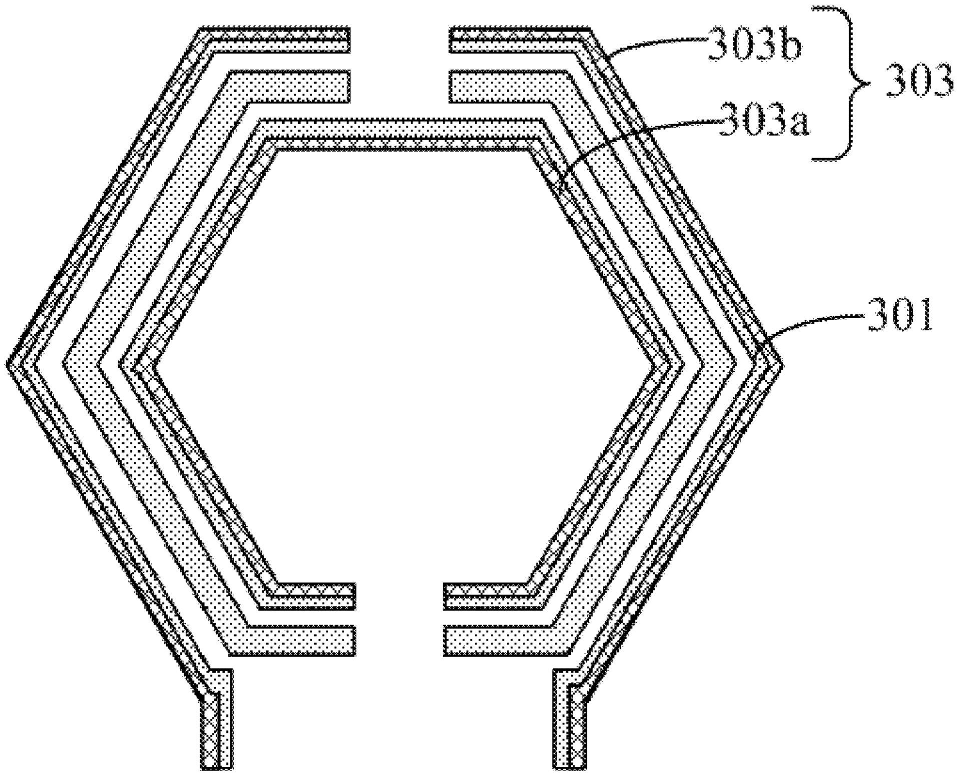

FIG. 10 and FIG. 11 illustrate schematic diagrams of an inductor coil according to another embodiment of the present disclosure.

FIG. 10 illustrates a cross-sectional view of the inductor coil. FIG. 11 illustrates a top view of first coil layer 301 and an electrical connection layer 303 in FIG. 10 along a R direction.

The inductor coil includes: a substrate 300; stacked coil layers on the substrate 300 including first coil layer 301 and second coil layer 302, and each coil layer including a plurality of sub-coil structures in a same layer; an electrical connection layer 303 between the first coil layer 301 and the second coil layer 302, the first coil layer 301 being connected to the second coil layer 302 in parallel through the electrical connection layer 303, any cross-section perpendicular to the substrate 300 and simultaneously passing through all the sub-coil structures in the first coil layer 301 and the second coil layer 302 passing through the electrical connection layer 303.

In one embodiment, the inductor coil further includes: a first dielectric layer 305 on the substrate 300, the first coil layer 301 being in the first dielectric layer 305; an interconnection medium layer 307 on the first coil layer 301 and the first dielectric layer 305, the electrical interconnection layer 303 being on the interconnection medium layer 307; and a second dielectric layer 306 on the electrical interconnection layer 303 and the interconnection dielectric layer 307, the second coil layer 302 being in the second dielectric layer 306.

Structures of the first coil layer 301 and the second coil layer 302 are same as structures of the first coil layer 201 and the second coil layer 202 in FIG. 6 to FIG. 9, which are not repeated herein.

In one embodiment, the electrical connection layer 303 includes a plurality of sub-connection structures. Number of the sub-connection structures is smaller than number of the sub-coil structures in a same layer.

Specifically, number of sub-coil structures included in the first coil layer 301 and number of sub-coil structures included in the second coil layer 302 are all 3. Number of sub-connection structures included in the electrical connection layer 303 is 2, which are denoted as the first sub-connection structure 303*a* and the second sub-connection structure 303*b*. The first sub-connection structures 303*a* and the second sub-connection structures 303*b* are arranged at intervals relative to the sub-coil structures.

Since number of sub-connection structures is smaller than number of sub-coil structures in a same layer, and all the sub-connection structures are arranged at intervals relative to the sub-coil structures, distances among sub-connection structures are increased, thereby reducing parasitic capacitances among all the sub-connection structures, alleviating a decrease of the quality factor Q of the inductor coil decreases at a high frequency, and improving the overall working efficiency of the inductor coil.

By adjusting number of sub-connection structures included in the electrical connection layer 303, the maximum quality factor Qmax that the inductor coil can achieve and the quality factor Q of the inductor coil at a high frequency can be better balanced. When number of sub-connection structures is large, a contact area between the electrical connection layer 303 and each coil layer is relatively large, so that the electrical resistance of the inductor coil is relatively low, thereby improving the maximum quality factor Qmax that the inductor coil can achieve. However, distances among the sub-connection structures are small, which leads to an increase in parasitic capacitances among all the sub-connection structures, thereby decreasing the quality factor Q of the inductor coil at a high frequency. When number of sub-connection structures is small, distances among all the sub-connection structures are relatively large, thereby reducing parasitic capacitances among all the sub-connection structures and improving the quality factor Q of the inductor coil at a high frequency. However, contact areas between the electrical connection layer 303 and all the coil layers are small, so that a reduction degree of the electrical resistance of the inductor coil is limited, and an improvement range of the maximum quality factor Qmax that the inductor coil can achieve is limited. Therefore, by selecting an appropriate number of sub-connection structures, the inductor coil can be applied to inductors with different performance requirements.

In one embodiment, all the sub-coil structures are arranged in concentric rings and all the sub-connection structures are arranged in concentric rings. A distance between the first sub-connection structure 303*a* and a center of the concentric rings is smaller than a distance between the second sub-connection structure 303*b* and the center of the concentric ring. Each sub-coil structure includes a first sidewall close to the center of the concentric rings and a second sidewall away from the center of the concentric rings, and each sub-connection structure includes a third sidewall close to the center of the concentric rings and a fourth sidewall away from the center of the concentric rings.

The third sidewall of the first sub-connection structure 303*a* and the first sidewalls of the sub-coil structures in contact with the first sub-connection structure 303*a* are coplanar. The fourth sidewall of the second sub-connection structure 303*b* and the second sidewalls of the sub-coil structures in contact with the second sub-connection structure 303*b* are coplanar. Therefore, a distance between the first sub-connection structure 303*a* and the second sub-connection structure 303*b* is further expanded, which is more conducive to reducing parasitic capacitances among all the sub-connection structures and can better alleviate the decrease of the quality factor Q of the inductor coil at a high frequency.

In other embodiments, a central axis of the first sub-connection structure and the second sub-connection structure may coincide with a central axis of the sub-coil structure in contact with the first sub-connection structure and the second sub-connection structure.

In another embodiment, number of coil layers included in the inductor coil is greater than 2, and all the coil layers are stacked. Each coil layer is connected in parallel through a plurality of electrical connection layers, and a projection pattern of each electrical connection layer on the surface of the substrate is within a range of projection patterns of two adjacent coil layers in contact with the electrical connection layer on the surface of the substrate. Each coil layer includes a plurality of sub-coil structures in a same layer, and any cross section perpendicular to the substrate and simultaneously passing through all sub-coil structures in two adjacent coil layers passes through an electrical connection layer.

Materials of two adjacent coil layers in contact with the electrical connection layers are same or different.

As disclosed, the inductor coil and the forming method thereof provided by the present disclosure at least achieve the following beneficial effects.

In the inductor coil provided by the technical solution of the present disclosure, since any cross-section of all the sub-coil structures perpendicular to the substrate and simultaneously passing through two adjacent coil layers passes through an electrical connection layer, a distribution range of the electrical connection layers is expanded, thereby increasing contact areas among the electrical connection layers and all the coil layers, reducing the electrical resistance of the inductor coil, improving the quality factor Q of the inductor coil, and optimizing the working efficiency of the inductor coil.

Further, when number of sub-connection structures is greater than 1, since a distance between at least one set of adjacent sub-connection structures is greater than the first pitch of the sub-connection structures, distances among adjacent sub-connection structures are increased, thereby further reducing the parasitic capacitances among all the sub-connection structures, alleviating the decrease of the quality factor Q of the inductor coil at a high frequency, and improving the working efficiency of the inductor coil efficiency.

In the method of forming the inductor coil provided by the technical solution of the present disclosure, by forming a plurality of coil layers and a plurality of electrical connection layers, any cross section perpendicular to the substrate and simultaneously passing through all sub-coil structures in two adjacent coil layers passes through an electrical connection layer, thereby increasing contact areas between the electrical connection layers and all the coil layers, reducing the electrical resistance of the inductor coil, improving the quality factor Q of the inductor coil, and optimizing the working efficiency of the inductor coil.

Although the present disclosure is disclosed above but is not limited thereto. A person skilled in the art can make various changes and modifications without departing from the spirit and scope of the present disclosure. The scope of protection of the present disclosure shall be determined by the scope defined in the claims.

What is claimed is:

1. An inductor coil, comprising:

a substrate;

a plurality of stacked coil layers being on the substrate, each coil layer including a plurality of sub-coil structures on a same layer; and a plurality of electrical connection layers between two adjacent coil layers, a projection pattern of each of the plurality of electrical connection layers on a surface of the substrate being within a range of projection patterns of two adjacent coil layers that are in contact with the plurality of electrical connection layers on the surface of the substrate, all the plurality of coil layers being connected in parallel through all the plurality of electrical connection layers, and any section that is perpendicular to the substrate and simultaneously passes through all the plurality of sub-coil structures in two adjacent coil layers passes through an electrical connection layer, wherein:

each electrical connection layer includes a plurality of sub-connection structures in a same layer, and an upper surface and a lower surface of each sub-connection structure respectively contact the sub-coil structures on different layers;

a number of sub-connection structures included in each electrical connection layer is greater than one, and the sub-connection structures are arranged in concentric rings; and a distance between at least one set of adjacent sub-connection structures is greater than a first pitch of the sub-connection structures.

2. The inductor coil according to claim 1, wherein materials of the two adjacent coil layers in contact with all the plurality of electrical connection layers are same or different.

3. The inductor coil according to claim 1, wherein a number of sub-coil structures included in each coil layer is greater than one, and the sub-coil structures are arranged in concentric rings.

4. The inductor coil according to claim 1, wherein:

each coil layer has a second pitch, and the second pitch is a sum of an average width of all the sub-coil structures in the coil layer and an average spacing among all the sub-coil structures; and the first pitch is a minimum value of the second pitch of two coil layers connected to the sub-connection structures.

5. The inductor coil according to claim 1, wherein each sub-coil structure includes a first sidewall close to a center of concentric rings and a second sidewall away from the center of the concentric ring, and each of the sub-connection structures includes a third sidewall close to a center of concentric rings and a fourth sidewall away from the center of the concentric rings.

6. The inductor coil according to claim 5, wherein a sub-connection structure closest to the center of the concentric rings is a smallest sub-connection structure, the third sidewall of the smallest sub-connection structure and first sidewalls of all the sub-coil structures in contact with the smallest sub-connection structure are coplanar; and the fourth sidewall of a sub-connection structure adjacent to the smallest sub-connection structure and second sidewalls of all the sub-coil structures in contact with the sub-connection structure are coplanar.

7. The inductor coil according to claim 5, wherein a sub-connection structure farthest from the center of the concentric rings is a largest sub-connection structure, the fourth sidewall of the largest sub-connection structure and second sidewalls of all the sub-coil structures in contact with the largest sub-connection structure are coplanar; and the third sidewall of a sub-connection structure adjacent to the largest sub-connection structure and first sidewalls of all the sub-coil structures in contact with the sub-connection structure are coplanar.

8. The inductor coil according to claim 1, wherein a number of the sub-connection structures is equal to a number of sub-coil structures in a same layer.

9. The inductor coil according to claim 1, wherein:

each sub-coil structure has a same width; and a ratio of a width of a sub-connection structure to a width of a sub-coil structure ranges from 1:3 to 2:3.

10. The inductor coil according to claim 1, wherein each electrical connection layer includes a plurality of discretely arranged conductive plugs.

11. The inductor coil according to claim 3, wherein the sub-coil structures in a same layer are electrically connected through connecting bridges.

12. An inductor coil, comprising:

a substrate;

a plurality of stacked coil layers being on the substrate, each coil layer including a plurality of sub-coil structures on a same layer; and a plurality of electrical connection layers between two adjacent coil layers, a projection pattern of each of the plurality of electrical connection layers on a surface of the substrate being within a range of projection patterns of two adjacent coil layers that are in contact with the plurality of electrical connection layers on the surface of the substrate, all the plurality of coil layers being connected in parallel through all the plurality of electrical connection layers, and any section that is perpendicular to the substrate and simultaneously passes through all the plurality of sub-coil structures in two adjacent coil layers passes through an electrical connection layer, wherein each electrical connection layer includes a plurality of sub-connection structures in a same layer, and an upper surface and a lower surface of each sub-connection structure respectively contact the sub-coil structures on different layers;

a number of sub-connection structures included in each electrical connection layer is greater than one, and the sub-connection structures are arranged in concentric rings; and a number of sub-connection structures is less than a number of sub-coil structures in a same layer.

13. The inductor coil according to claim 12, wherein materials of the two adjacent coil layers in contact with all the plurality of electrical connection layers are same or different.

14. The inductor coil according to claim 12, wherein a number of sub-coil structures included in each coil layer is greater than one, and the sub-coil structures are arranged in concentric rings.

15. The inductor coil according to claim 12, wherein a number of the sub-connection structures is equal to a number of sub-coil structures in a same layer.

16. A method of forming an inductor coil, comprising:

providing a substrate; and forming a plurality of stacked coil layers on the substrate, and a plurality of electrical connection layers between two adjacent coil layers, a projection pattern of each of the plurality of electrical connection layers on a surface of the substrate being in a range of projection patterns of two adjacent coil layers in contact with the electrical connection layers on the surface of the substrate; and each coil layer including a plurality of sub-coil structures in a same layer, all the plurality of coil layers being connected in parallel through all the plurality of electrical connection layers, and any section that is perpendicular to the substrate and simultaneously passes through all the plurality of sub-coil structures in two adjacent coil layers passing through an electrical connection layer, wherein each electrical connection layer includes a plurality of sub-connection structures in a same layer, and an upper surface and a lower surface of each sub-connection structure respectively contact the sub-coil structures on different layers;

a number of sub-connection structures included in each electrical connection layer is greater than one, and the sub-connection structures are arranged in concentric rings; and a number of sub-connection structures is less than a number of sub-coil structures in a same layer.

17. The method according to claim 16, further comprising:

forming a first dielectric layer on the substrate and a first coil layer in the first dielectric layer.

18. The method according to claim 17, wherein a method of forming the first dielectric layer and the first coil layer includes:

forming the first dielectric layer on the substrate;

forming first grooves on the first dielectric layer; and forming the first coil layer in the first grooves.

19. The method according to claim 16, further comprising:

forming an interconnection dielectric layer on the first dielectric layer and the first coil layer and the electrical connection layers in the interconnection dielectric layer.

20. The method according to claim 19, wherein a method of forming the interconnection dielectric layer and the electrical connection layers includes:

forming the interconnection dielectric layer on the first dielectric layer and the first coil layer;

forming interconnection grooves on the interconnection dielectric layer; and forming the electrical connection layers in the interconnection grooves.

* * * * *